United States Patent
Yu

(10) Patent No.: US 6,942,291 B2
(45) Date of Patent: Sep. 13, 2005

(54) BICYCLE SADDLE

(75) Inventor: Tsai-Yun Yu, Taichung Hsien (TW)

(73) Assignee: Selle Tech Industrial Co., Ltd., Taichung Hsien (TW)

( * ) Notice: Subject to any disclaimer, the term of this patent is extended or adjusted under 35 U.S.C. 154(b) by 0 days.

(21) Appl. No.: 10/758,011

(22) Filed: Jan. 16, 2004

(65) Prior Publication Data

US 2005/0104423 A1 May 19, 2005

(30) Foreign Application Priority Data

Nov. 14, 2003 (TW) ........................................ 92132075 A

(51) Int. Cl.⁷ .................................................. B62J 1/26
(52) U.S. Cl. ...................................... 297/200; 297/199
(58) Field of Search ............................ 297/195.1, 199, 297/200, 202, 214, 215.16

(56) References Cited

U.S. PATENT DOCUMENTS

| | | | | |
|---|---|---|---|---|
| 609,944 A | * | 8/1898 | Page ........................... | 297/202 |
| 654,720 A | * | 7/1900 | Englebert .................... | 297/202 |
| 674,451 A | * | 5/1901 | Bunker ........................ | 297/200 |
| 2,314,046 A | * | 3/1943 | Kalter .......................... | 297/200 |
| 2,324,976 A | * | 7/1943 | Soper .......................... | 297/214 |
| 2,558,389 A | * | 6/1951 | Robinson ..................... | 297/200 |
| 5,203,607 A | * | 4/1993 | Landi .......................... | 297/214 |
| 5,244,251 A | * | 9/1993 | Bourla ......................... | 297/199 |
| 5,419,612 A | * | 5/1995 | Rassekhi ..................... | 297/200 |
| 6,095,601 A | | 8/2000 | Yu | |

* cited by examiner

*Primary Examiner*—Peter R. Brown
(74) *Attorney, Agent, or Firm*—Birch, Stewart, Kolasch & Birch, LLP

(57) ABSTRACT

A bicycle saddle includes a rigid/semi-rigid shell functioning as a supporting structure for the bicycle saddle. A covering is disposed on the shell and attached thereto, with a padding between the shell and the covering. The padding comprise a cushion made of a resilient material. The cushion includes a plurality of cavities and is attached to the top of the shell such that the cavities would work as pneumatic cushions with air cushions/air springs interposing between the shell and the rider's body.

7 Claims, 4 Drawing Sheets

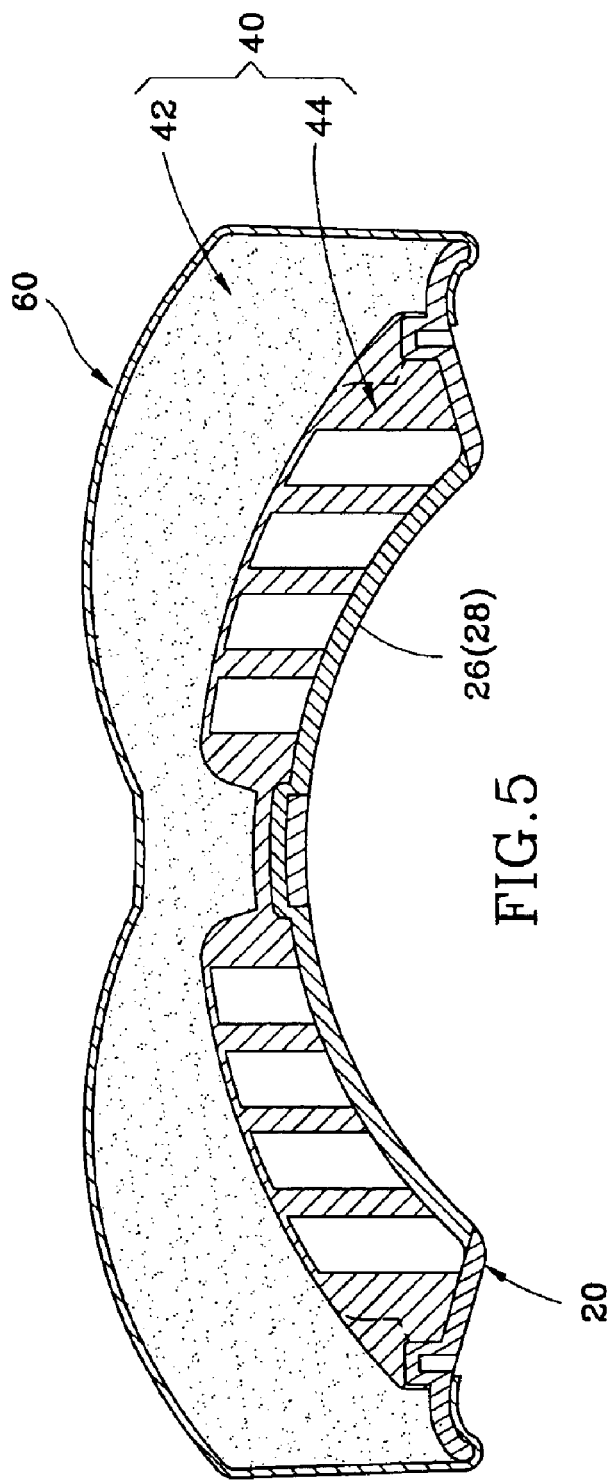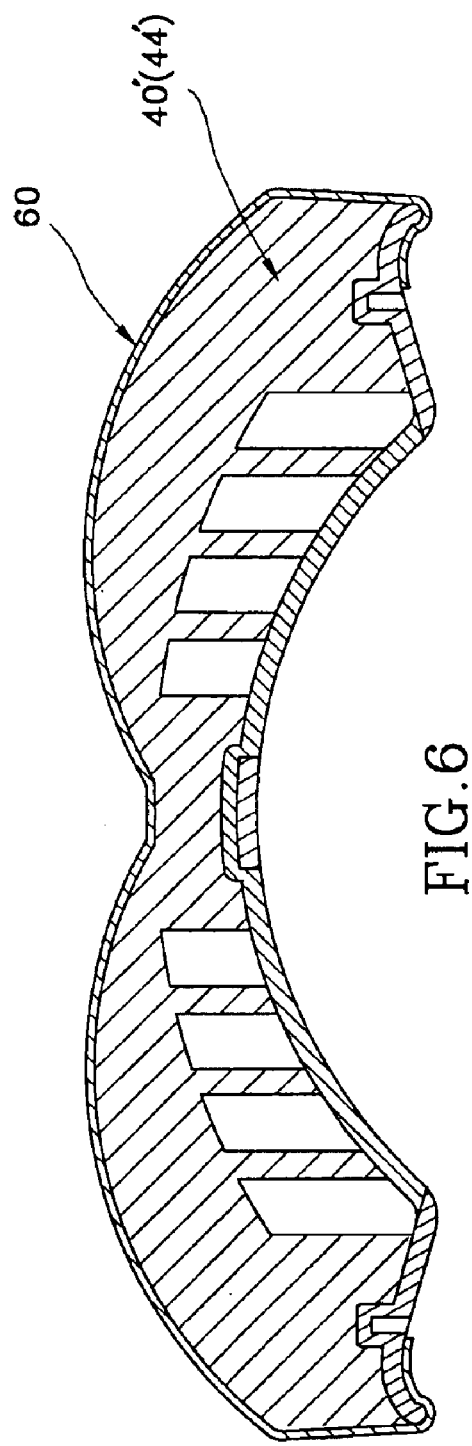

BICYCLE SADDLE

This Nonprovisional application claims priority under 35 U.S.C. §119(a) on Patent Application No(s). 92132075 filed in Taiwan on Nov. 14, 2003, the entire contents of which are hereby incorporated by reference.

BACKGROUND OF THE INVENTION

1. Field of the Invention

The present invention relates generally to a bicycle saddle and, more particularly to an improved bicycle saddle, which not only reduces vibration and absorbs shock during riding, but also evenly distributes the pressure from the rider placed on the seating surface of the saddle.

2. Description of the Related Art

When riding a bicycle, the rider will receive a regular transmission of energy periodically for contacting with a surface having rapid rhythmic movement back and forth. This transmission of energy is the so-called vibration, which will causes fatigue. The riders, for example, may suffer fatigue from vibration inflicted by a bicycle driven at higher speeds over a hard surface, such as a paved street.

Shock herein said is a transfer of high amplitude energy to a person, which can cause serious trauma—tissues or bones may be fractured or crushed instantly upon impact with a hard surface. Shock is likely to occur, for example, when one rides a bicycle over a rough surface, such as an unpaved road, an abrupt displacement of the vehicle is transmitted directly through the rigid frame, seat, and control surfaces to the rider.

Commercially available bicycle saddles primarily consist of an injection molded plastic shell carrier shaped to form the basic profile then covered with a layer of padding, usually a polyurethane foam and a protective cover.

In order to reduce vibration, it is suggested to interpose an energy absorbing medium between the vibrating surface and the body. Gel-like viscoelastic materials have been used as an energy absorbing medium. Such materials are generally incompressible and exhibit both viscous and elastic properties. When subjected to vibration, viscoelastic materials produce a retardation of the effect of the forces acting on the body, which introduces hysteresis into the cycle, and represents a loss of resilient energy. This reduces or dampens vibration. However, gel-like viscoelastic materials also have proven difficult to use because they are heavy, and do not absorb shock adequately due to their relative incompressibility.

In order to absorb shock, sprung saddles have been developed, which include coil springs inserted between the underside of the saddle shell and the rails which mount the saddle to the seat post to attenuate the shock load. However, for being too heavy, sprung saddles are only suitable for regular bicycles, not practical for racing bicycles or mountain bikes.

Accordingly, what is needed is a bicycle saddle that is lightweight and capable of damping vibration, absorbing shock and evenly distributing pressure.

SUMMARY OF THE INVENTION

A bicycle saddle in accordance with the present invention generally includes a rigid/semi-rigid shell functioning as a supporting structure for the bicycle saddle. A covering is disposed on the shell and attached thereto, with a padding between the shell and the covering.

The padding may comprise a cushion made of a resilient material, the cushion having a plurality of cavities and attached to the top of the shell such that the cavities would work as pneumatic cushions with air cushions/air springs interposing between said shell and the rider's body.

The novel bicycle saddle disclosed herein, by means of the aforesaid arrangement, therefore provides a seating surface having a soft medium to reduce vibration and a pneumatic cushion to absorb shock and evenly distribute pressure, thereby reducing rider fatigue.

BRIEF DESCRIPTION OF THE DRAWINGS

The advantages and features of the present invention will be better understood by the following description when considered in conjunction with the accompanying drawings, in which:

FIG. 5 is a sectional view of a bicycle saddle in accordance with a second embodiment of the present invention; and FIG. 6 is a sectional view of a bicycle saddle in accordance with a third embodiment of the present invention.

DETAILED DESCRIPTION OF THE INVENTION

Figure 1:
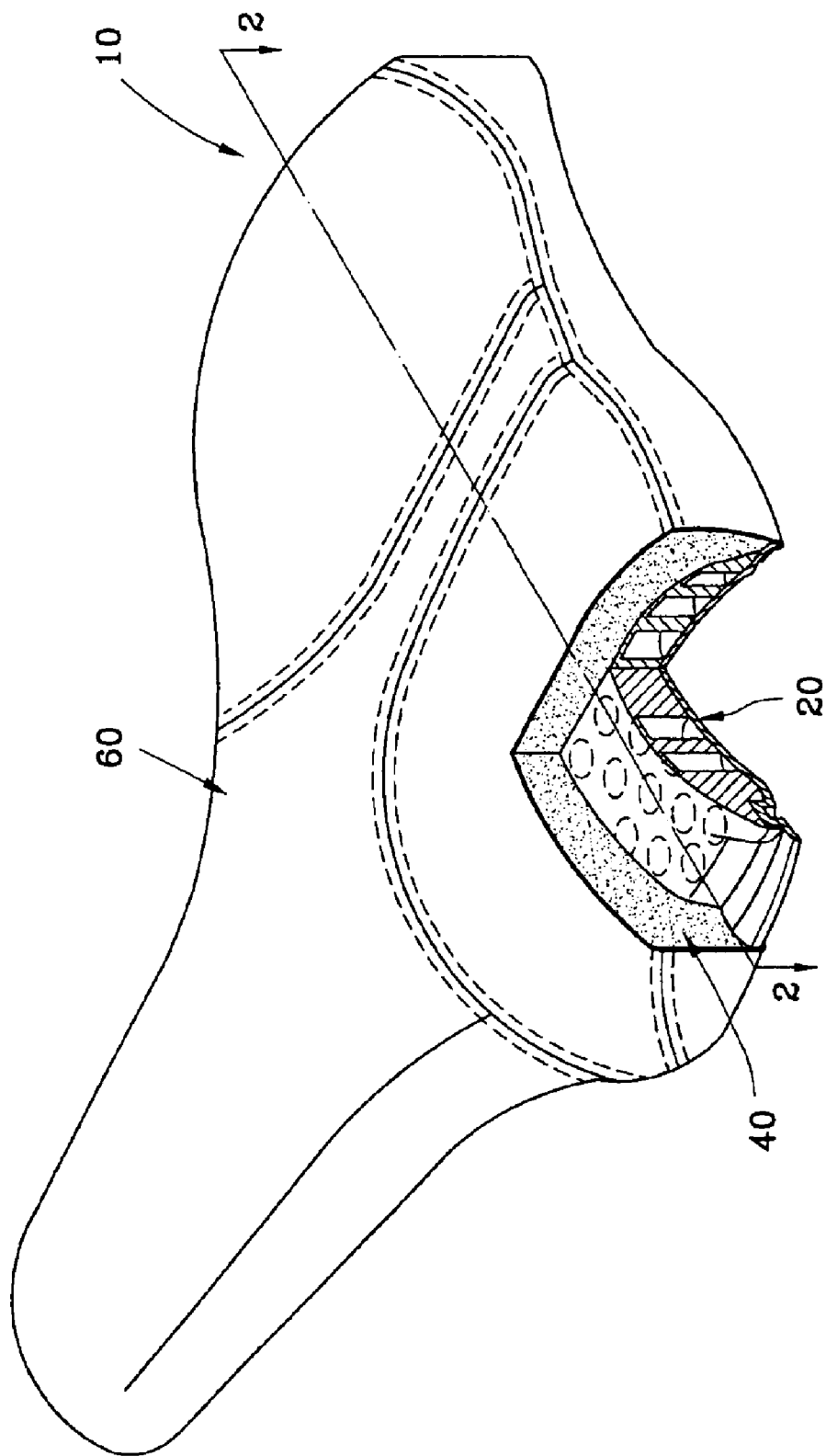
FIG. 1 is a perspective view of a bicycle saddle with a portion cut away in accordance with an embodiment of the present invention.
Figure 2:
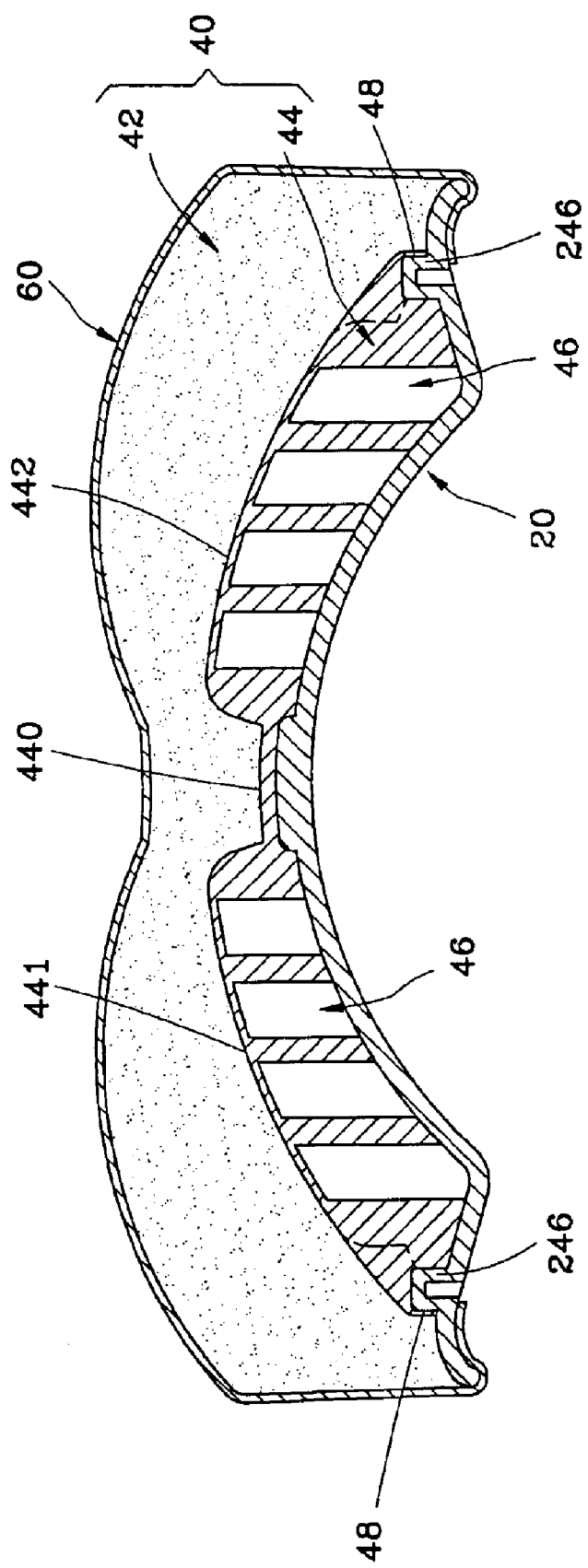
FIG. 2 is a sectional view of the embodiment taken along line 2—2 of FIG. 1.
Figure 3:
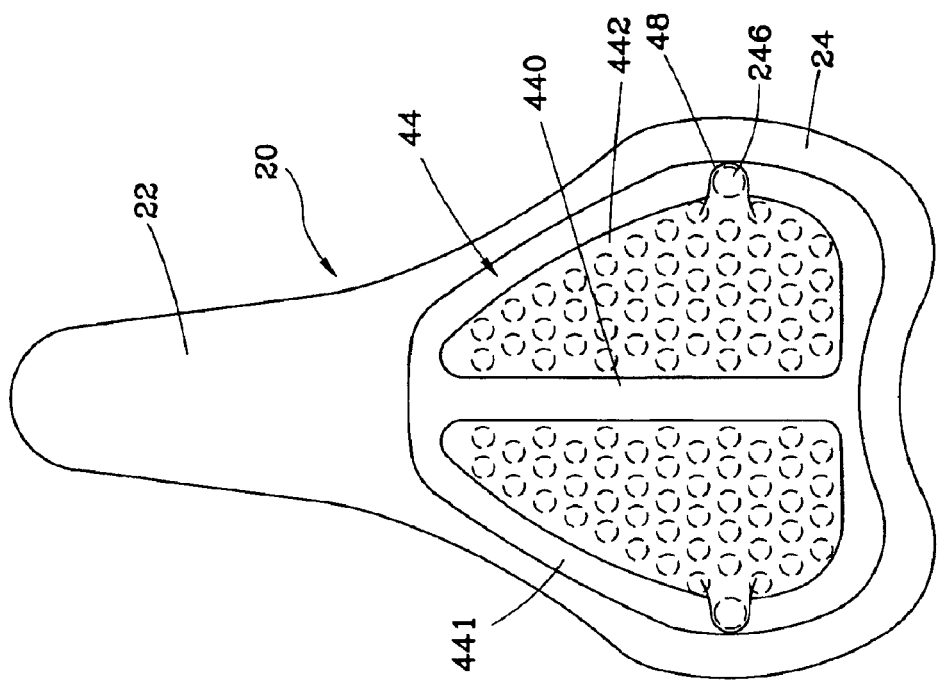
FIG. 3 is a top view of the shell attached with the cushion of the embodiment.
Figure 4:
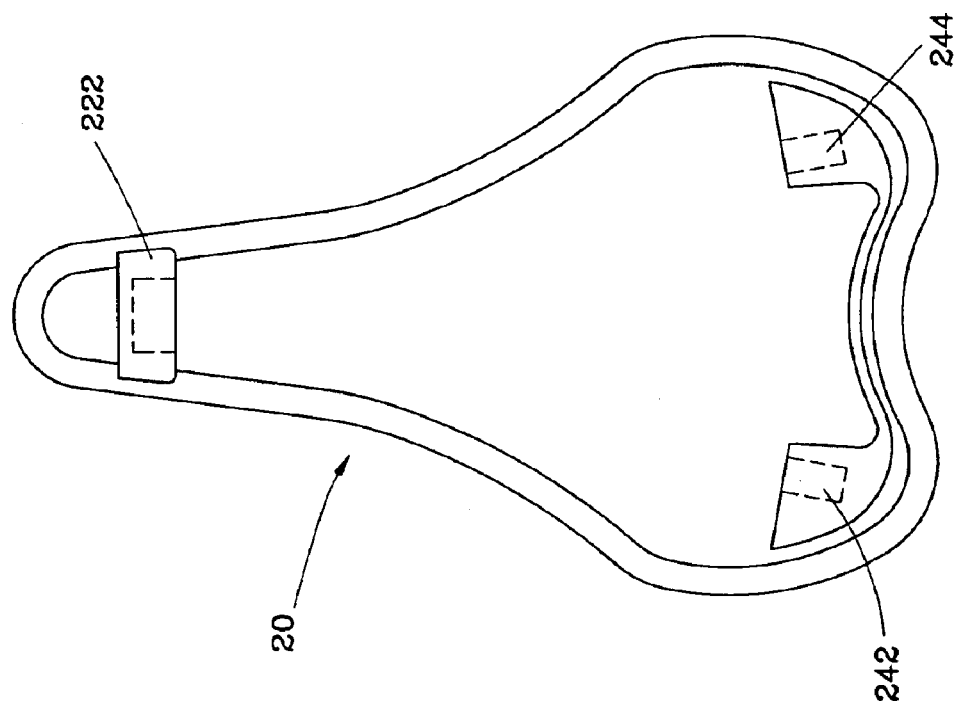
FIG. 4 is a bottom view of the shell of the embodiment.

Referring to FIGS. 1–4, a bicycle saddle 10 in accordance with the present invention is shown comprising a shell 20, a padding 40, and a protective covering 60.

The shell 20 is made of a rigid plastic material by molding, forming the supporting structure and profile of the bicycle saddle 10. The shell 20 has a nose-like front end 22 and a relatively wider rear end 24 backwardly extended from the front end 22. The shell 20 can be made according to U.S. Pat. No. 6,095,601, i.e., the shell 20 is provided with a shock absorbing area comprising two receiving spaces 26 and filler means 28 formed of a plastic material of hardness lower than the shell 20 (shown in FIG. 5). The front end 22 has a front plug hole 222 in the underside thereof. The rear end 24 has two rear plug holes 242 and 244 arranged on the edge thereof. The front plug hole 222 and the rear plug hole 242 and 244 are adapted to receive a rail (not shown).

The padding 40 includes a plastic foam layer 42 and a cushion 44. The cushion 44 is made of a resilient material, such as plastics, rubber, silicone gels, vinyl plastisols, polyurethane elastomers, or any suitable material that has a rate of deformation being proportional to the applied stress. The cushion 44 has a central depression 440 arranged longitudinally along the top of the cushion 44 dividing the cushion 44 into a left part 441 and a right part 442.

The thickness of the cushion 44 is gradually greater from the depression 440 toward the two opposite lateral sides thereof. A plurality of cylindrical cavities 46 are independently symmetrically formed in the left part 441 and the right part 442. Each of the cavities 46 has an open end formed on the bottom of the cushion 44, and a depth being proportional to the thickness of the cushion 44.

The cushion 44 having a shape corresponding to the rear end 24 is directly attached to the upper surface of the rear end 24 and fixed thereon by fitting the two rear locating aperture 48 of the cushion 44 to the corresponding locating rods 246 at the rear end 24 of the shell 20. The plastic foam layer 42 is covered on the top of the cushion 44 and the upper surface of the front end 22 of the shell 20. Of course, the padding 40 can only be the cushion 44 as shown in FIG. 6.

The protective covering 60 can be made of leather or plastic sheet material. The protective covering 60 is stretched over the padding 40 and secured to the underside of the shell 20. The upper surface of the covering 60 of course provides the seating surface that the rider sits on.

As mentioned, the cushion 44 sandwiched in between the shell 20 and the plastic foam layer 42 would work as an energy absorbing medium interposing between the vibrating surface and the body. This lowers the amplitude of the vibration on the body, which, consequently reduces the amount of energy that is transferred. The cylindrical cavities 46 with the open ends attached to the upper surface of the shell 20 would work as many pneumatic cushions/air springs interposing between the vibrating surface and the body. This provides satisfactory shock absorption and distribution of pressure.

While the present invention has been described in connection with certain preferred embodiments, it is to be understood that the subject matter encompassed in the present invention is not to be limited to those specific embodiments. On the contrary, it is intended for the subject matter of the invention to include all alternatives, modifications and equivalents as can be included within the spirit and scope of the claims.

What is claimed is:

1. A bicycle saddle comprising:
   a rigid/semi-rigid shell having an upper surface and an underside, said shell having a narrow front end and a wide rear end;
   a protective covering;
   a padding disposed between said shell and said covering; said padding comprising a cushion made of a resilient material, said cushion having a plurality of cavities and attached to the upper surface of said shell such that said cushion would work as pneumatic cushions with air cushions/air springs interposing between said shell and the rider's body, said cushion being arranged on the upper surface of said rear end, said cushion including a central depression running longitudinally along the top side of said cushion to divide said cushion into a left part and a right part, each of said parts of said cushion having a thickness being gradually greater from said depression toward the opposite lateral sides thereof.

2. The bicycle saddle as claimed in claim 1, wherein said padding further comprises a plastic foam layer disposed between said cushion and said covering.

3. The bicycle saddle as claimed in claim 1, wherein said cushion is made of a flexible plastic material.

4. The bicycle saddle as claimed in claim 1, wherein said cushion has the top side connected with said covering and a bottom side attached to said upper surface of said shell, each of said cavities has an open end formed on the bottom side of said cushion.

5. The bicycle saddle as claimed in claim 1, wherein each of said cavities has a depth being proportional to the thickness of said cushion.

6. The bicycle saddle as claimed in claim 1, wherein each of said cavities has an open end formed on the side of said cushion attached to said shell.

7. The bicycle saddle as claimed in claim 1, wherein said cushion has at least one locating aperture arranged on the edge thereof, and said shell has at least one locating rod respectively fitted into said locating aperture of said cushion.

* * * * *